UNITED STATES PATENT OFFICE.

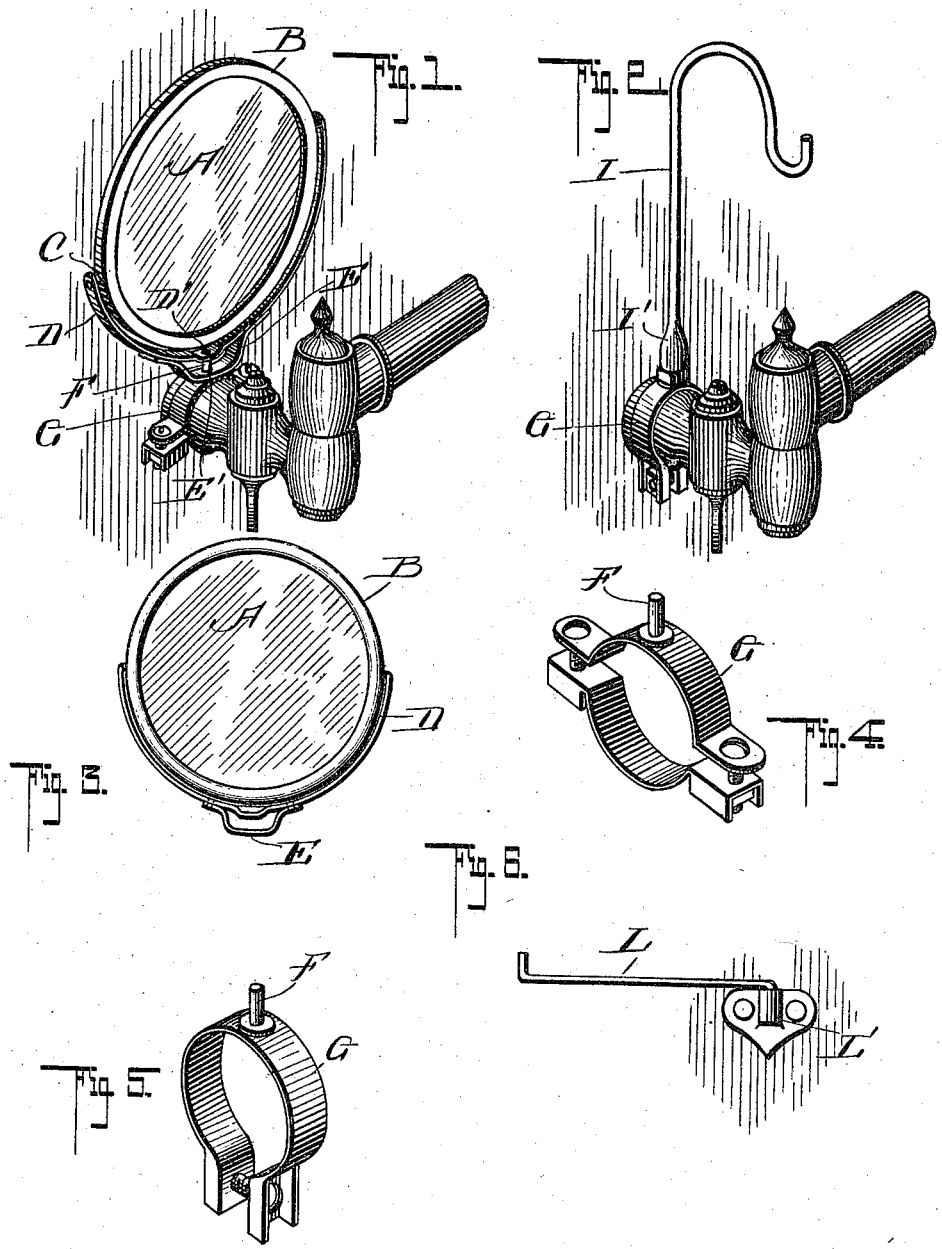

SAMUEL BACHARACH, OF PHILADELPHIA, PENNSYLVANIA.

ADJUSTABLE MIRROR AND SUPPORT.

965,430.	Specification of Letters Patent.	Patented July 26, 1910.

Application filed July 22, 1908. Serial No. 444,794.

*To all whom it may concern:*

Be it known that I, SAMUEL BACHARACH, a citizen of the United States, residing in Philadelphia, in the State of Pennsylvania, have invented a new and useful Improvement in Adjustable Mirrors and Supports, of which the following is a specification.

This invention is an improved construction of an adjustable mirror and also the adjustable means for supporting said mirror upon any suitable object, such as gas-bracket, supporting arm and the like, the object being to provide for a multiplicity of adjustments whereby the proper light can always be maintained by the adjustment either of the position of the mirror or of its support.

Another object of the invention is to provide a mirror and its support of such construction that the mirror can be supported from either the bottom or top as desired and another object is to provide supporting means of such construction that they can be arranged in connection with various forms of stationary objects.

With these various objects in view my invention consists in the novel features of construction and combination, all of which will be fully described hereinafter and pointed out in the claim.

In the drawings forming a part of this specification:—Figure 1 is a perspective view of a mirror supported in accordance with my invention, the support being attached to a gas bracket. Fig. 2 is a perspective view showing one form of detachable support adapted for use in connection with the mirror and its supporting frame. Fig. 3 is a face view of a mirror and the frame within which it is located. Fig. 4 is a detail perspective view of a split collar carrying the supporting pivot. Fig. 5 is a detail perspective view of a slightly different construction of collar and Fig. 6 shows a modified detail of construction.

In the practical embodiment of my invention I employ a mirror A which is located in a frame B, said frame being provided with laterally projecting trunnions C which turn freely in the ends of a supporting frame D, said supporting frame being centrally pivoted and consequently capable of being turned to any desired angle, and inasmuch as the mirror held within the frame can also be turned at any angle desired and moves in a plane at right angles to the plane in which the frame moves, it is obvious that any desired adjustment can be had.

It will of course be understood that the mirror can be any size or shape desired and the supporting frame will of course be made to conform to the general shape of the mirror.

In practice I prefer to depress the bottom portion of the frame D very slightly, and I also provide a pivot-opening D' at this point and a bearing strip E is attached to the bottom of the frame and is constructed with a pivot opening E' which alines with the opening D' and in this way a proper bearing is provided for the pivot, and by having the slightly depressed portion all danger of the mirror-frame contacting with the pivot is avoided. The pivot F is preferably connected to a split collar G, which collar can be attached to a gas-bracket or any other suitable object and when the said collar has been secured to the bracket, or other suitable object, the supporting frame carrying the mirror is fitted upon the pivot F.

In Fig. 4 I have shown the split collar G made in two pieces, the ends being secured together by means of bolts and nuts, while in Fig. 5 I have shown the said collar made in one piece and the opposing ends are clamped together by means of a bolt and nut, thereby securely fastening this form of collar upon a gas-bracket or any other suitable device.

In Fig. 2 I have shown a rod I having a socket I' at its lower end which is adapted to fit upon the pivot F and the upper end of this rod is curved over and hooked to provide a means for supporting the mirror and supporting frame, and it will be understood that this hooked rod I may be any size desired and when it is made short the mirror and frame are supported from below whereas when it is made long the mirror and frame are suspended from above. As before stated the rod I may be of various lengths, and furthermore, it may be given any suitable shape so long as the hooked end is maintained at one end and the socket portion at the other.

In Fig. 6 I have shown a pivoted arm L capable of attachment to any stationary object and adapted to support the mirror and its frame, and it will of course be understood that any size and shape of frame can be used in connection with this arm L and that the said arm can be used either as a support or as a suspending means.

It will thus be seen that I provide a mirror which in connection with its adjustable support is capable of quick and ready adjustment so as to get proper light, and by having the mirror and its support detachable as well as adjustable the said mirror and support can be quickly and easily detached from one object and attached to another.

Having thus fully described my invention, what I claim as new and desire to secure by Letters Patent is:—

A device of the kind described comprising in combination a mirror, a supporting frame in which said mirror is pivoted, the lower central portion of said supporting frame being depressed and apertured, a bearing strip attached to said supporting frame beneath the depression and also apertured and a supporting pivot adapted to enter said bearing strip and depressed portion of said frame substantially as set forth.

SAML. BACHARACH.

Witnesses:
CHAS. E. BROCK,
CHAS. TECHNER.